April 30, 1963 L. W. BREHM 3,087,420

ULTRA SPEED PRINTER

Filed Nov. 19, 1959 11 Sheets-Sheet 1

INVENTOR
LYLE W. BREHM
BY Melvin P. Williams
AGENT

April 30, 1963 L. W. BREHM 3,087,420

ULTRA SPEED PRINTER

Filed Nov. 19, 1959 11 Sheets-Sheet 4

April 30, 1963 L. W. BREHM 3,087,420

ULTRA SPEED PRINTER

Filed Nov. 19, 1959 11 Sheets-Sheet 10

United States Patent Office
3,087,420
Patented Apr. 30, 1963

3,087,420
ULTRA SPEED PRINTER

Lyle W. Brehm, Endicott, N.Y., assignor to International Business Machines Corporation, New York, N.Y., a corporation of New York Filed Nov. 19, 1959, Ser. No. 854,146
8 Claims. (Cl. 101—93)

This invention relates to a high speed mechanical printer, and more particularly to a printer capable of operating at a sufficiently high speed to render it operable as an in-line output device for a computer or other fast data processing machines.

In the use of data processing machines and computers, it is generally necessary to print computation results in a form readable by human being in order to derive a useful output from the machine. Heretofore, the speed of printing has been so much lower than the speeds at which a computer can perform computations and emit results that the computer has had to wait for pinting to be completed: a wait 100 times as long as the time necessary to compute is not uncommon. In many instances, the type of operation being performed permitted wasting computer time. However, along with recent developments of high speed computers, more and more applications are being found in which the useful output of the machine must be printed as fast as the machine completes the computation.

The faster methods of printing are typically chemical, magnetic and electrostatic; however, these printers have the disadvantages of more complex equipment, extreme high cost, inability to produce instantaneous multiple copies, and do not provide the permanance and high quality of print known to be available with mechanical printers. Mechanical printers are therefore preferred for most applications. The speeds of mechanical printers are reduced by the inertia problems inherent with the mass of the mechanical parts involved. The highest speed mechanical printers now in use are of the matrix type, in which the paper is impressed with a plurality of dots arranged in the configuration of a character; these dots are frequently formed by impact of the end of a wire or other impression element against a ribbon or other carbon-carrying member. This type of printer is well known and is illustrated in U.S. Patent No. 2,730,040, R. B. Johnson, January 10, 1956. The mechanical inertia problems are partly overcome because of the relatively low mass of the wires and the short stroke required to make an impression. The wires used in forming any one character may be suitably displaced from the unused wires before all the wires are moved together toward the platen; these wire displacing means (or wire setup means) have mass and inertia, which limit the speed at which character setups can be changed. Another form of wire printer provides suitable, individually-operable wire-moving means whereby only selected wires are moved toward the platen. A typical wire printer may have a wire matrix comprising seven rows of five wires each for each print position; in multiple column or page printers, in which an entire line of printing is to be effected simultaneously, there is not enough space available at each print position for thirty-five wire-moving means of the type heretofore used in matrix printers.

It is the primary object of my invention to provide an ultra speed mechanical printer which can receive the output from a computing machine and print corresponding characters at speeds of the same order of magnitude as the computation speed. Another object of my invention is to provide a wire printer having minimum inertia limitations. A further object of my invention is to provide a mechanical printer unlimited by any inertia problems except in the mechanical impressing elements per se. It is another object of my invention to provide a high speed mechanical printer adapted for printing a piece of paper or other web while said paper or web is in-flight. Another object of my invention is to provide a high speed in-flight wire printer which can print in the neighborhood of 15,000 lines per minute with a quality of printing heretofore unobtainable at speeds in excess of about 5,000 lines per minute.

My invention contemplates the use of very small impressing elements (for instance, short wires) in combination with electrostatic clutches, which clutches can receive signals from a buffered computer output to operate the small impressing elements in response thereto. A clutch of this type is disclosed in copending application Serial No. 639,988, now U.S. Patent No. 2,909,996, High Speed Printing Mechanism, filed February 13, 1957, by Clyde J. Fitch. The output of a computer or other data processing machine is fed through suitable code adjusting means directly into buffer storage. The code adjusting means changes the data from the code used in the computer into a code which corresponds to the printing elements used to print the character-representing data received from the computer. Sufficient storage is provided to store an entire line of print simultaneously. Because of the high speed inherent in this printer, the data may be read out of storage in ripple fashion (serially) to latches (or other bistable devices) corresponding to each of the electrostatic clutches, the latches thereafter operating selected electrostatic clutches simultaneously. The printing elements are arranged in a row perpendicular to the path of paper, there being several elements for each character position on the paper, each of said elements being operable a plurality of times to print each character.

One advantage of this form of printer is that the paper is continuously in motion, removing the inertia problems of starting and stopping the paper. Another advantage is that there is a bare minimum of mechanical mass in the mechanical impressing means. Another advantage of this invention is that there is a single line of wires per character, rather than a matrix of wires for each character, which facilitates the arrangement of the wires, and electrostatic clutches used to move said wires, about the printing platen. Another advantage of this invention is that it requires much fewer parts for a full page printer than do prior devices. Another feature of this invention is the simplicity of the electrical encoding and impression element firing means, which provides for inherently more reliable operation.

The foregoing and other objects, features and advantages of my invention will be apparent from the following more particular description of preferred embodiments thereof, as illustrated in the accompanying drawings.

In the drawings:

FIG. 1 comprises a perspective view of the printing mechanism and a simplified functional block diagram of the electronic control circuits therefor.

CONTENTS

| | Column |
|---|---|
| Brief Description of Printer Operation (FIG. 1) | 3 |
| Printing Mechanism (FIGS. 1–6) | 4 |
| Code Converter (FIGS. 7–10) | 5 |
| Buffer Storage (FIG. 11) | 7 |
| Loading Buffer Storage (FIGS. 12 and 15) | 8 |
| Reading Out of Buffer Storage (FIGS. 13 and 16) | 9 |
| Printing Control (FIGS. 14 and 16) | 10 |
| Summary (FIG. 16) | 13 |

*Brief Description of Printer Operation*

Figure 1:
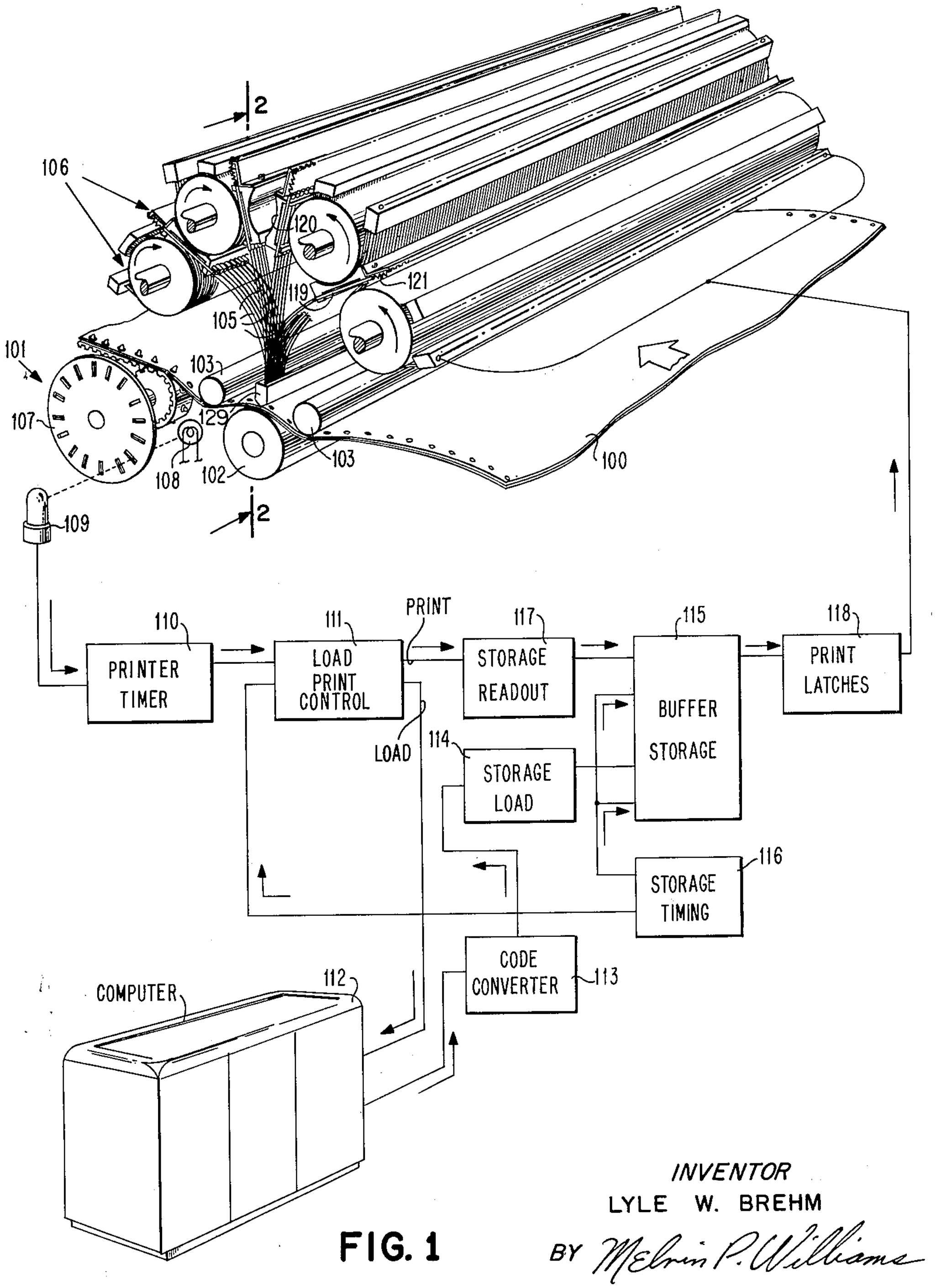
Figure 4:
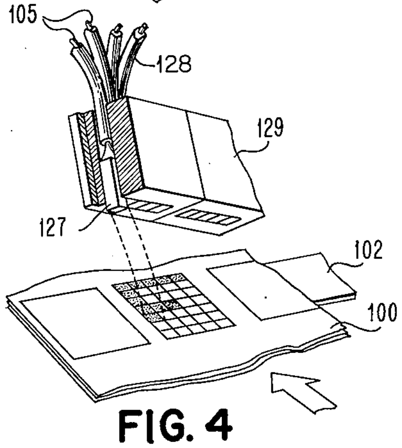
FIG. 4 is a perspective view of the printing mechanism of FIGS. 1–3 showing the details of the print wires and the manner in which the wires impress the printed sheet.
Figure 16:
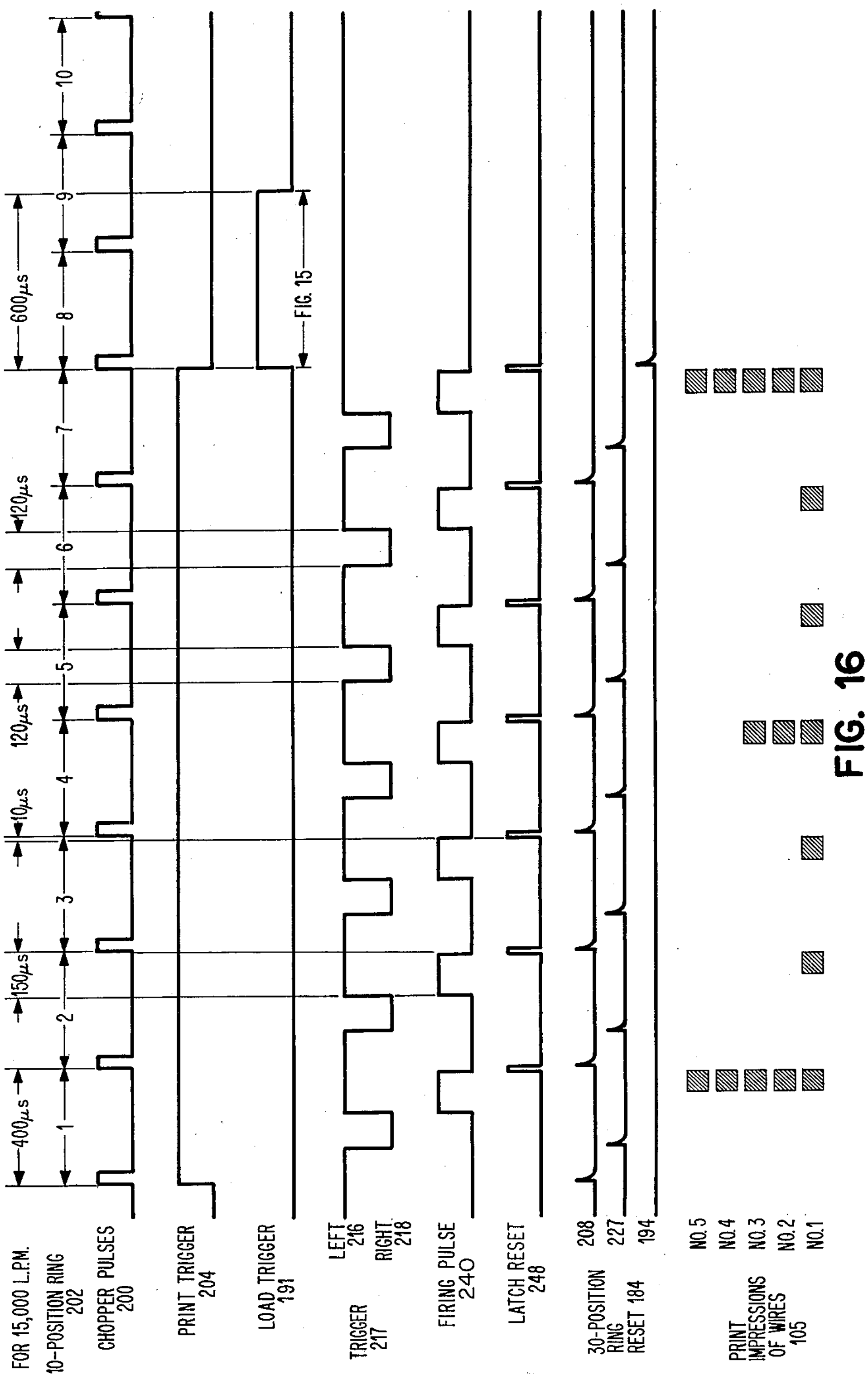
FIG. 16 is a diagram showing the time relationship of an entire printing cycle of my preferred embodiment.

Referring now to FIG. 1, in one embodiment of my invention a form 100 comprising layers of copy paper and carbon paper is continuously fed to the left by a sprocket drive unit 101 between a rotating platen 102 and a pair of idler rollers 103. Over the platen 102 in a line perpendicular to the motion of paper there is a print head assembly in which a plurality of print wires 105 are disposed; each of the print wires is resiliently urged away from the platen 102 and is movable toward the platen by an electrostatic clutch mechanism 106, to be described below in detail. Each line printed on the paper may contain as many as 120 characters, for example, each of which is composed of selected dots from a matrix, five dots wide and seven dots high. As the paper 100 moves continuously beneath the single row of wires 105, each of the 600 print wires (five wires each for 120 characters) may be operated as many as seven times in order to form the character, as shown in FIGS. 4 and 16.

Attached to the sprocket drive assembly 101 is a chopper wheel 107 which permits pulses of light energy from a bulb 108 to impinge on a photoelectric cell 109. The output of the photoelectric cell comprises pulses of electrical energy which are in synchronism with the movement of paper 100 beneath the print wires 105; the slits on the chopper disk 107 are arranged so as to provide one pulse for each position on the paper which may receive a dot impression from the print wires. A magnetic spot timing ring, or other synchronous pulse generator could be used instead of a photo chopper as shown. The pulses from the photocell 109 operate "printer timing" circuitry shown schematically in FIG. 1 as block 110. (Note that the blocks in FIG. 1 are not necessarily coextensive with the actual circuits used to perform the indicated functions). The printer timing circuitry in turn controls a "load-print control" circuit shown schematically as block 111. When the paper is moving from a position where one line of characters are printed to a position where the next line of characters will be printed, the "load-print control" circuitry 111 conditions the printer to receive data from a "computer" 112. The data output from the "computer" 112 is fed to a "code converter" 113 where it is converted from the computer code (for instance, a well-known seven bit code) into a code corresponding to the dot matrix which represents the character. The output from the "code converter" 113 is passed to a "storage load" circuit 114; the "buffer storage" 115 is loaded with data in a manner prescribed by the "storage timing" circuit 116. When data corresponding to 120 characters have been stored in the "buffer storage" 115, the "storage timing" circuit 116 switches the "load-print control" 111 into the printing phase of operation. In the printing phase of operation, the position on the paper 100 which is to receive the first row of dots of the matrix is approaching the row of print wires 105. The "load-print control" 111 conditions the "storage readout" circuitry 117 to drive the data out of "buffer storage" in a manner prescribed by the "storage timing" circuit 116. The "buffer storage" 115 is unloaded in ripple fashion: serially, or bit by bit. The data rippling out of the "buffer storage" 115 is temporarily stored in "print latches" 118 until all of the data representing the first row of dots in each matrix for 120 characters have been read out of buffer storage; thereafter a timing pulse combines with the outputs of the "print latches" to energize selected ones of the electrostatic clutches so as to simultaneously move those print wires only which are to be used in the top row of the matrix in forming the current line of characters. The various parts of the mechanism and circuitry, and the operation and timing of this embodiment, are described more fully below.

*Printing Mechanism*

Figure 2:
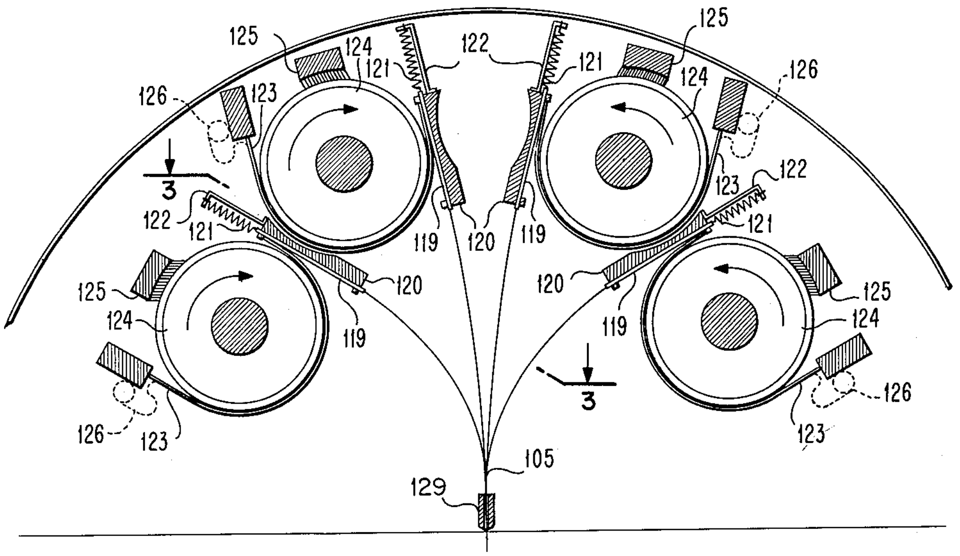
FIG. 2 is a side elevation of the printing mechanism shown in FIG. 1.

Referring now to FIG. 2, each print wire 105 is attached to a rigid driving member 119 which is slidably restrained in a secured frame member 120. The driving members 119 are urged upward (that is, away from the paper) by a spring 121 which is attached to the frame 120 by a bracket 122. Each of the driving members 119 has attached to it a thin conductive strap 123 each of which partially encircles a constantly revolving electrostatic clutch drum 124 which comprises a semiconductive material. The clutch drums 124 are maintained at a ground or neutral potential so that when a suitable voltage pulse is applied to the conductive strap 123 over an electric lead wire 126, a potential difference is created between the strap 123 and the drum 124, which develops an electro-adhesive force of sufficient magnitude to cause the strap 123 to adhere to the drum 124 and be carried along thereby. Thus the print wire is impelled towards the paper and causes a printing impression thereon. A plurality of brushes 125 provide a cleaning lubricant to the surface of the drums 124. The driving members 119 must be of insulating material, or be connected to the straps 123 in such a manner as will insulate the straps from the print wires 105.

Figure 3:
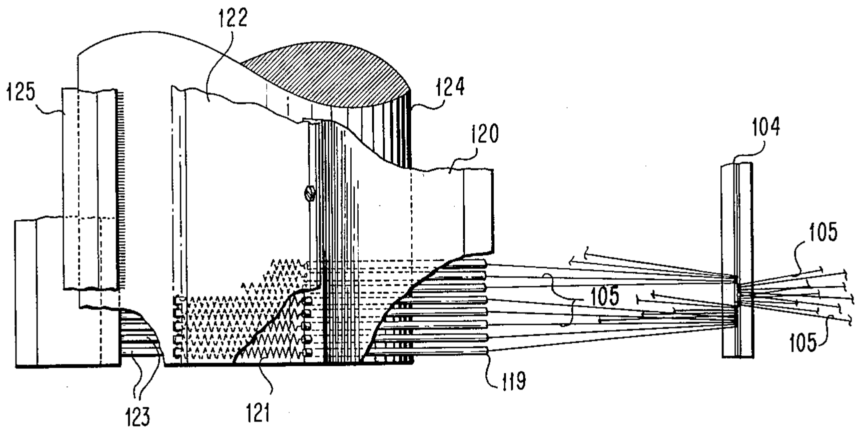
FIG. 3 is a sectional view of the printing mechanism taken on the line 3—3 in FIG. 2.

FIG. 3 shows the staggered arrangement of the print wires; the first 5 print wires are arranged adjacent one another, the next three groups of five print wires are arranged about the other three drums 124; the fifth group of five wires is arranged adjacent the first group of five wires. This staggered arrangement permits placing the print wires 105 sufficiently close together so as to form the desired character and yet provides adequate room for the somewhat larger conductive straps 123 and driving members 119. Any other suitable staggering arrangement might be used to satisfy design expediency.

FIG. 4 shows the detail of the print wires 105, which may have a square impression-end 127 thereon if desired; a square dot (as shown) gives a better appearance in forming long straight lines of a character such as in the letter "L" or the letter "T," but a round dot provides a better appearance in sloping letters such as the letter "A," or in rounded letters such as the letter "G"; the choice of round or square dots is a matter of preference. Each print wire 105 is housed within a guide tube 128 which is imbedded in the molding of a print head 129; when an electrostatic clutch is fired, the associated print wire 105 slides within the guide tube 128. The other end of the guide tubes 128 may be similarly restrained by the frame member 120, shown in FIG. 2. The spacing between the print head 129 and the paper 100 in FIG. 4 has been exaggerated for clarity; in the printer, the print head 129 and paper 100 would be only a small fraction of an inch apart. The manner in which the letter "E" is printed is shown: all five wires within the print head are operated in the first row of printing, only the first wire (that shown extended in FIG. 4) is operated during the next two rows of printing; the first three wires to the left are operated in the fourth row of printing; and only the first wire at the left is operated in printing the current row of dots.

Figure 5:
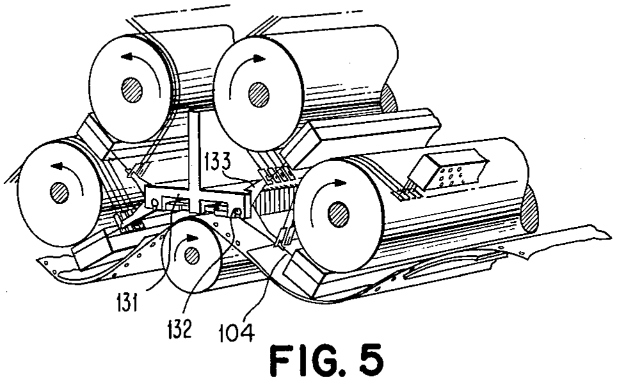
FIG. 5 is a partial perspective view of an alternative print impression mechanism.
Figure 6:
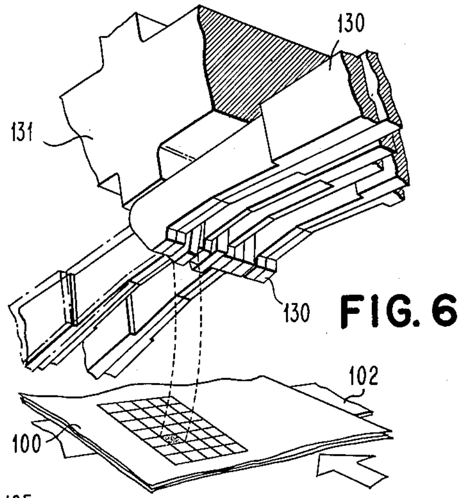
FIG. 6 is a perspective view showing the details of the alternative mechanism in FIG. 5.

An alternative form of print-impressing elements is shown in FIGS. 5 and 6. These elements comprise hammers 130 which are restrained in a frame 131 by pivots 132. An extension 133 on each hammer 130 is directly connected to a conductive strap 123 in the same manner as are the driving members 119 shown in FIG. 2. When the electrostatic clutch is operated, the strap pulls on the extension 133, causing the hammer 130 to rotate about the pivot 132 and impress the paper 100. The hammers are restored by springs 104.

*Code Converter*

Figure 8:
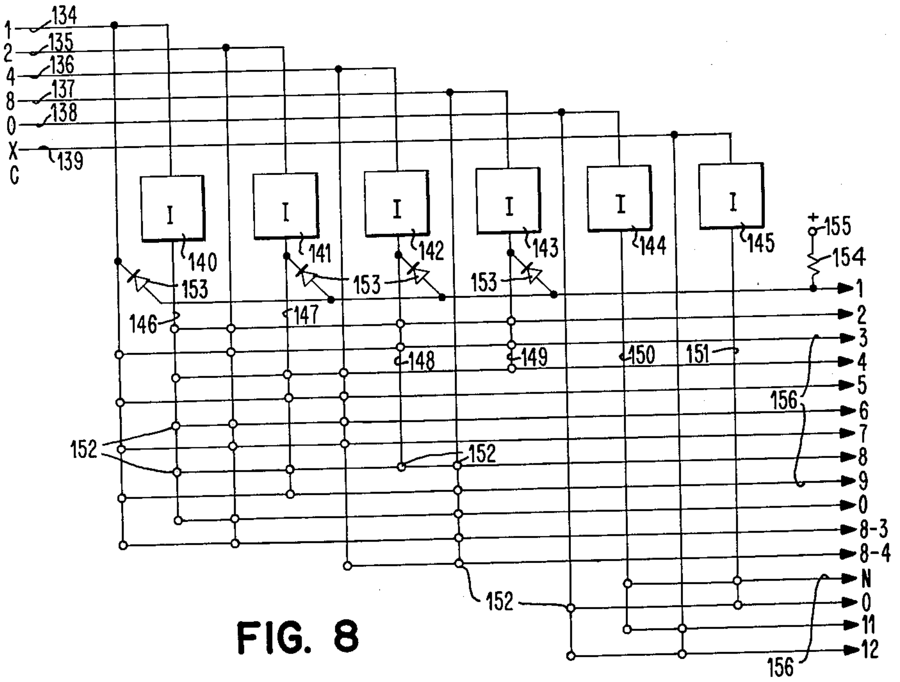
FIG. 8 is a schematic diagram of the first stage of a code converting device used to convert the code shown in FIG. 7.
Figure 8A:
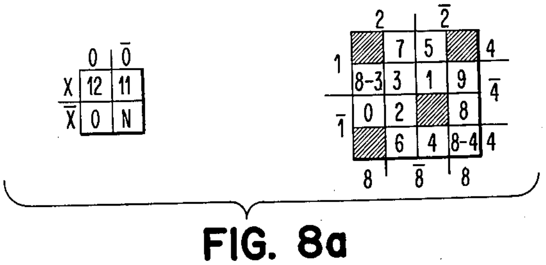
FIG. 8a is a diagram of the input and output code relationship in the device of FIG. 8.
Figure 7:
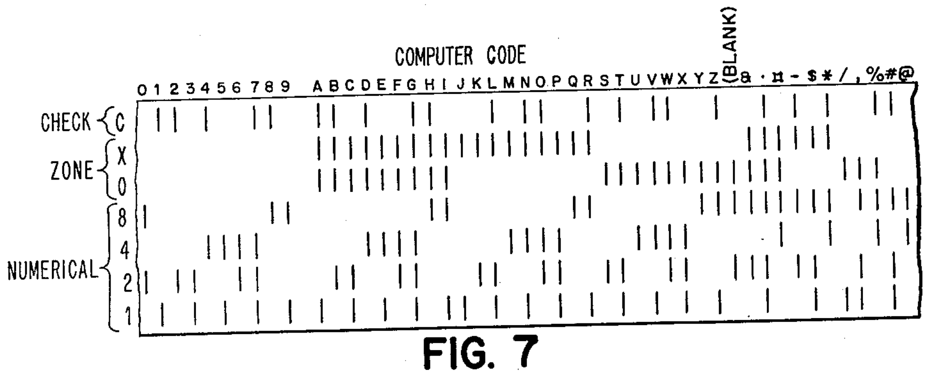
FIG. 7 is a diagram showing a well-known computer code used in the illustrative embodiments.
Figure 9:
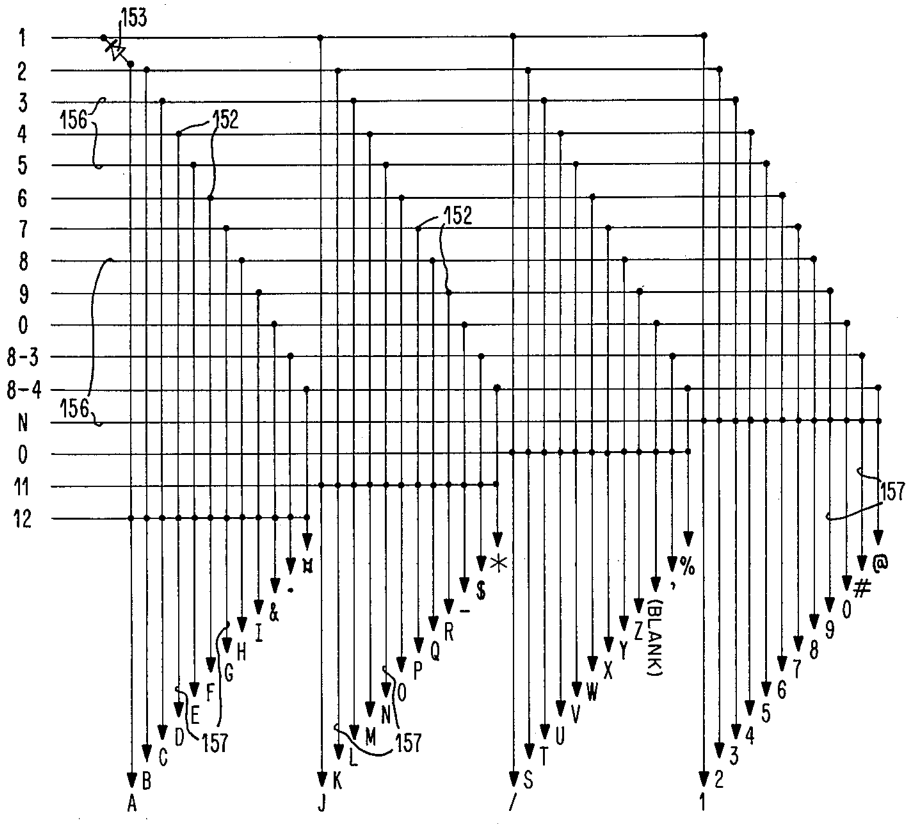
FIG. 9 is a schematic diagram of the second stage of the code converting device shown in FIG. 8.
Figure 10A:
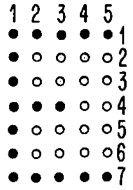
FIG. 10a shows the matrix of dots from which characters are formed.
Figure 10:
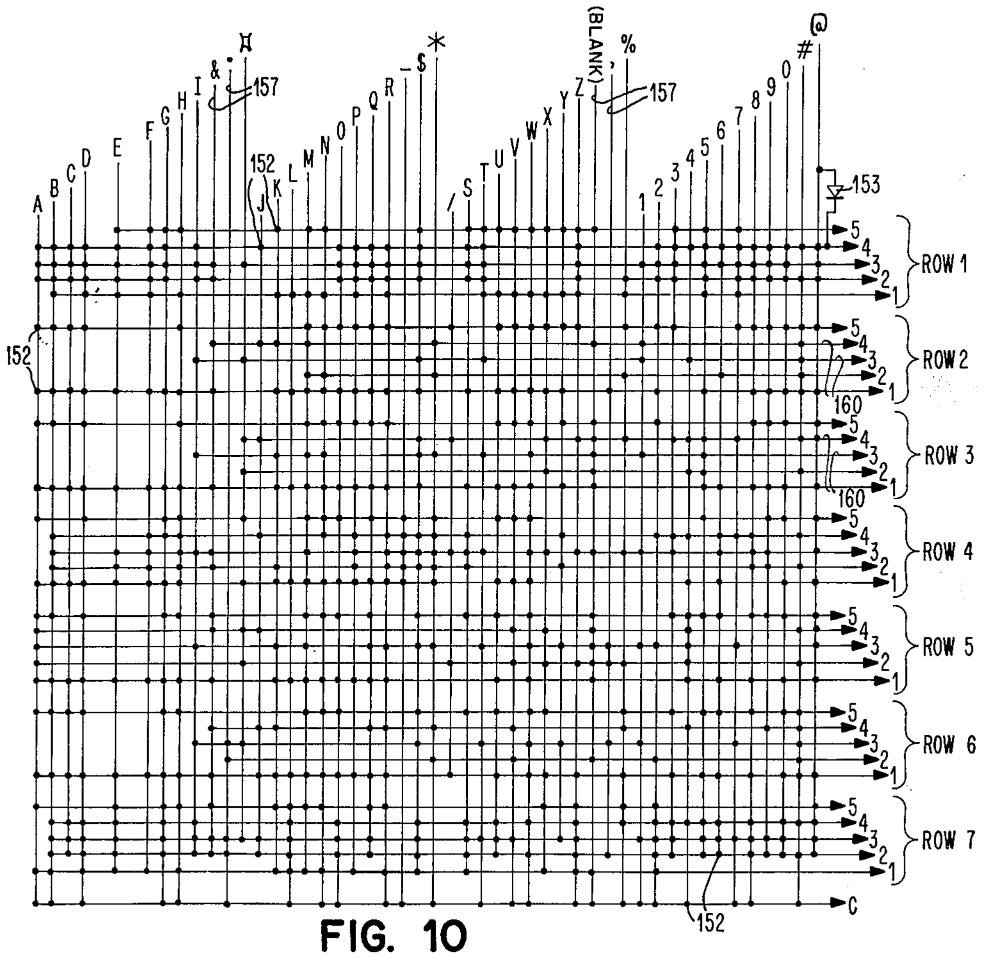
FIG. 10 is a schematic diagram of the third stage of the code converting device shown in FIGS. 8 and 9.

In the description of FIG. 1, a code converter 113 was introduced to convert from a 7-bit computer code to a 35-bit code corresponding to a print matrix. A typical 7-bit computer code, which is primarily a binary code, is shown in FIG. 7. Starting at the top of FIG. 7, the first code bit is a check bit given the designation "C": this bit will be disregarded, since it does not affect printer operation; the next two bits are zone bits given the designation of "X" and "0" respectively; the remaining four bits are numerical and have the binary designations of 8, 4, 2 and 1 respectively. In printing the characters in this embodiment, any combination of five print wires may be operated in any combination or from one to seven times in order to print the desired character. Therefore, each character which may be selected for printing must be represented by signals which will tell the printer which of the five wires are to be operated in each of seven successive impressions. It therefore requires thirty-five bits to represent a character for printer control. A table showing this 35-bit code would be fairly extensive and is believed unnecessary in view of the definition of this code inherent in the circuit description of FIG. 10. A conversion from the 7-bit code to the 35-bit code is accomplished in three stages which are shown in FIGS. 8, 9 and 10 respectively. The 7-bit code is shown in the upper left-hand corner of FIG. 8, and the intermediate code (which is primarily a decimal code) is shown at the right-hand side of FIG. 8; each line 134, 135, . . . 139 is connected to a corresponding inverter circuit 140, 141, . . . 145. The outputs of the lines 134–139 are used in combination with the inverted outputs on corresponding lines 146, 147, . . . 151 to form the intermediate code. Each of the connections 152 comprises a diode 153 connected between a vertical and a horizontal one of the lines so as to form an AND circuit in each horizontal line. The AND circuit operates as in the following example. If a 1 is received on line 134, the 1 may be part of a 3, 5, 7, 9, or 8—3, or it may represent the actual number 1; to get a 1 out at the right side of FIG. 8, the top-most of the lines 156 must be made positive by the positive voltage source 155. As long as any one of the diodes 153 can conduct, there will be a voltage drop across the resistor 154, and the top line 156 will be negative with respect to the voltage source 155. If the 2, 4 and 8 lines (135, 136, 137) are all negative (that is, with no signal thereon) then the inverters 141, 142 and 143 will all have positive outputs, so each of the corresponding diodes 153 will be blocked. Since there is a signal on line 134, the related diode 153 will also be blocked: therefore, no voltage-dropping current will flow through the resistor 154, and the line 156 representing a 1 will be at the positive potential of the source 155, indicating a 1 output. FIG. 8*a* shows the relationship between the two codes which determines the connections made. The 7-bit code is arranged on the outside of the two characteristic blocks, and the intermediate code appears on the inside of those blocks. A dash line over a symbol represents the fact that no such bit appears, which means the output of the corresponding inverter 140—145 will be positive; this positive inverter output is used to represent signals in the same manner as is the positive uninverted signals on the wires 134—139. The use of the coding diagrams may be clarified by taking examples. In the smaller of the blocks, which represents zone values, if a 0 and an X both appear, a 12 will result. If the zero appears but the X does not appear then a 0 will result; if no 0 appears and an X appears an 11 will result; if no 0 appears and no X appears an N will result. The larger of the two blocks represents digit values and the special character values 8—3 and 8—4; if an 8-pulse appears, and there is no 2, this confines us to the right-hand vertical row of the diagram; if there is also no 4-pulse this confines us to the central two boxes of the right-hand vertical row of the diagram; if there is no 1 then the 8 represents itself—an 8. However, if there is a 1, the 8 and 1 represent a 9. On the other hand, if an 8 appears and a 4 appears, the only possible result will be an 8—4 pulse. If an 8 appears and a 2 appears, the only possible pulse values are 8—3 and 0; if no 1 has appeared, the 8 and 2 pulses will result in a 0 which represents the numeral 10; on the other hand, if a 1 pulse does appear the 1 and 2 represent a 3 and the resulting pulse will be an 8—3 pulse.

After conversion, the data pulses pass over lines 156 to the second stage of the code converter, shown in FIG. 9. The conversion circuit in FIG. 9 changes the coded pulses into a code-form comprising alphabetic characters, numerals, and special characters, such as the dollar sign and the comma. The connections 152 in this circuit comprise diodes 153 which form AND circuits in vertical rows as in FIG. 8. The intermediate code is related to the alphameric code in the well-known way; an A comprises a 1 and a 12; a B comprises a 2 and a 12; each of the numerals represents itself when in combination with an N-pulse (which stands for no-zone or numeral); and each of the special characters referred to above comprises an 8—3 and 8—4 pulse together with a 12, 11, 0 or N-pulse. The alphameric code output is conducted by a plurality of lines 157 to the third stage of the code converter, shown in FIG. 10.

FIG. 10 converts the alphameric code into a code determined by which of the five print wires 105 contained in a print head 129 (FIG. 4) are to be used in each of seven successive printing impressions, which impressions are referred to as rows, 1 through 7. At the right-hand side of FIG. 10, are shown lines 160 corresponding to the five wires and seven print rows. Each of the connections 152 in this diagram comprises a diode 153 as in FIGS. 8 and 9. An example of this code is the letter "E" shown in FIGS. 10 and 10*a*: in order to print the letter "E," all five wires must make an impression in the first row; only the first wire must make an impression in the second row and third row; the first three wires make an impression in the fourth row; the first wire only is used in the fifth and sixth row; and all five wires again will print in the seventh row. It can be seen that for row 1, all of a group of lines 160 corresponding to row 1 are connected to the one of the lines 157 which corresponds to the letter "E"; only the number 1 wire for row 2 is connected to the wire corresponding to the letter "E," etc. Therefore, each character is coded according to the manner in which the five wires will print to form that character. The 35-bit code is carried over lines 160 for amplification, subsequently to the applied to thirty-five corresponding magnetic cores 163 which comprise the buffer storage unit shown in FIG. 11.

*Buffer Storage*

Figure 11:
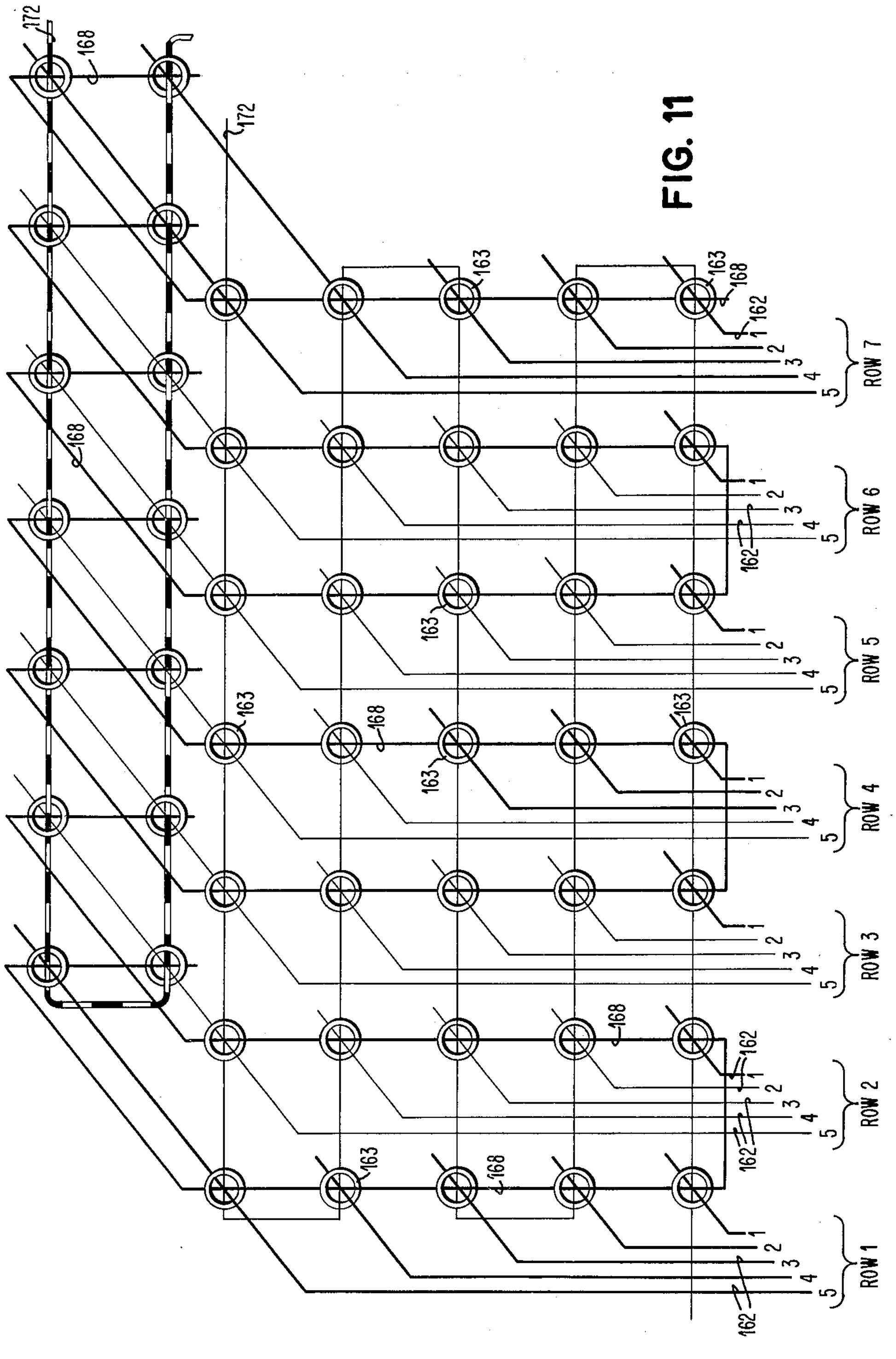
FIG. 11 is a simplified isometric drawing of the core plane arrangement in the buffer storage.
Figure 12:
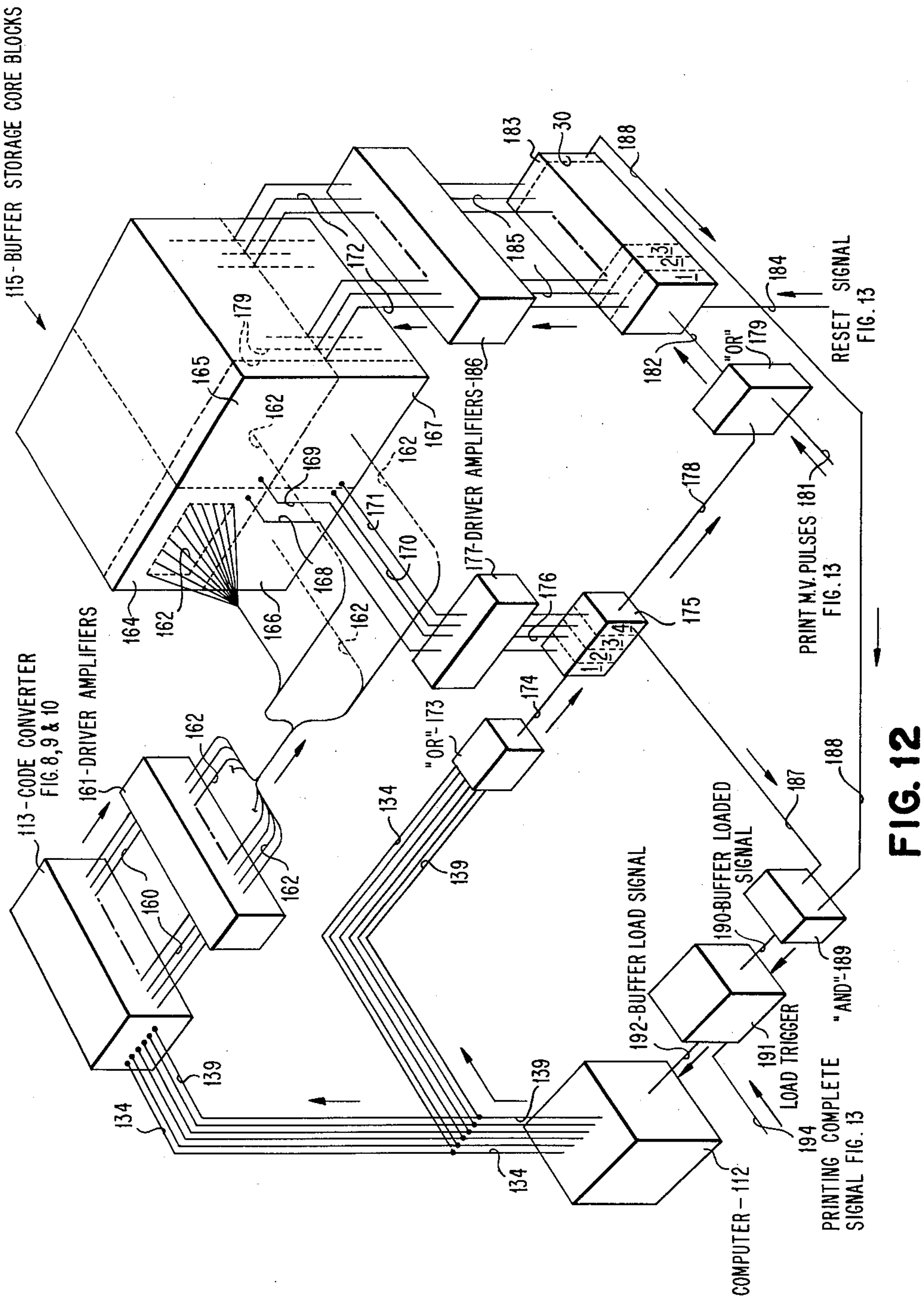
FIG. 12 is a block diagram of the electronic circuitry used to load the buffer storage with data from the computer.

Referring briefly to FIG. 12, the output from the computer 112 is carried over six lines 134–139 to the code converter 113 for conversion from the 6-bit computer code (7-bits minus the check bit, which will not be considered) to the 35-bit printing code. The code converter output is carried over lines 160 to thirty-five corresponding driver amplifiers 161 of any well-known type, the outputs of which are carried over thirty-five more corresponding lines 162 simultaneously to 120 core planes. Each plane comprises thirty-five cores 163 (FIG. 11). The 120 core planes are arranged in four blocks 164—167 each being thirty planes deep. Each time that a character is emitted by the code converter 113, the driver amplifiers corresponding to the bits used in that character send driving current to the corresponding cores in each of the 120 planes; in order to store a different character in each of the core planes, it is necessary to inhibit all of the planes except the one plane in which the character is to be stored. The plane in which the character is to be stored is determined by the position on the paper 100 in which the character is to be printed; in other words, each of the core planes corresponds to one of the print heads 129 (FIG. 4).

The way in which the correct core plane is selected is best illustrated with reference to FIG. 11 which shows the first plane of cores 163 in the block 164, it being identical to all the other core planes, and the top two lines of cores 163 of the immediately adjacent plane in the same block. At the bottom of FIG. 11, one wire 162 is provided for each of the bits in the 35-bit code; each of these wires goes to a corresponding core 163 in each of the 120 core planes. The wires which are shown dark and heavy have driving current therein, and those wires shown light have no driving current therein. The cores are shown being driven to store the letter "E." In the first row, all 5 cores are driven; in the next two rows only the first cores are driven; in the fourth row, only the first three cores are driven, etc. In order to determine which of the core blocks 164—167 should have this particular character stored therein, a block select line 168 also sends driving current through all of the cores in the selected block; in the three blocks which are not to receive the charatcer, the lines corresponding to the block select line 168 are not energized. It is conventional in core storage terminology to refer to the current necessary to saturate a core in a given direction as I-max; in FIG. 11, one-half I-max is sent through each of the character bit lines 162 which corresponds to a core which is in the configuration of the character being set up; similarly, the block select line 168 has one-half of I-max in it; therefore, all of the cores in the correct block, which are in the configuration of the character being stored, receive I-max and may saturate in the given signal direction. However, since each of the 120 characters is to be stored in a single plane, it is necessary that only one of the 30 planes in the selected block be allowed to store the character. There is provided a plane select line 172 for each of the 30 planes that comprise the depth of the blocks. The core plane select line 172 corresponding to the plane in which the character is to be stored receives no driving current at all; therefore, the cores in that plane receive half of I-max each from the selected character select lines 162 and from the block select line 168, which allows those cores to saturate in the given signal direction. On the other hand, the core plane select lines 172 corresponding to the other 29 planes (in which the character is not to be stored) receive one-half of I-max in the negative direction; this negative current bucks part of the I-max current received by the character select lines 162 and block select line 168, causing the cores to be driven by a net current of only one-half of I-max; these cores, therefore, are not saturated in the given signal direction. The manner in which the block select line 168 and core plane select line 172 are operated, so as to store each of the 120 character in turn, is shown in FIG. 12.

*Loading Buffer Storage*

Figure 15:
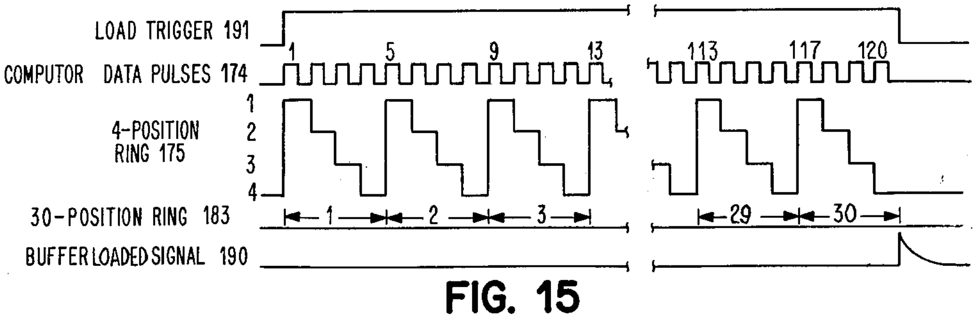
FIG. 15 is a timing diagram of the loading of buffer storage with data from the computer.

Referring now to FIG. 12, the output from the computer 112 is carried by lines 134—139 to be converted to the 35-bit code by the code converter 113. The 35-bit code is carried by thirty-five lines 160 to thirty-five corresponding driver amplifiers 161, which send driving current over thirty-five corresponding lines 162 to 120 planes of thirty-five corresponding cores 163 each within the buffer storage core blocks 115. The computer output is also carried by lines 134—139 to an OR circuit 173, which will give an output pulse on a line 174 for each of the 120 characters (or blank spaces) serially emitted from the computer, as shown in FIG. 15. The character pulses pass from OR circuit 173 over the line 174 to a 4-position ring circuit 175 of any well-known type. Each time the 4-position ring 175 receives a pulse from line 174, it will advance its setting by one, as shown in FIG. 15. When the fourth stage of the ring is on and a subsequent pulse is received on line 174, the ring will reset itself to the first position: this is known as a "closed-ring." Each stage of the 4-position ring 175 is connected by a line 176 to a corresponding one of 4 driver amplifiers 177, which send driving current over the previously introduced block select lines 168—171 to select the correct one of the core blocks 164—167. Therefore, the first 4 characters emitted from computer 112 are stored in core blocks 164, 165, 166 and 167, in that order. When the fourth stage of the 4-position ring 175 goes off, it sends an output pulse over a line 178 to an OR circuit 179. The OR circuit 179 can also receive pulses over a line 181 from a multivibrator 180 (FIG. 13) during the read out of the buffer storage for printing, as will hereinafter be described. The output of the OR circuit sends pulses over line 182 to a 30-position ring 183, to step the ring 183 as shown in FIG. 15. This ring is of the "open-end" type, which means that after the last position is pulsed, every position of the ring is off, and no stage can be turned on until the first stage is reset by a reset signal appearing on line 184. Each stage of the 30-position ring 183 is connected by a corresponding line 185 to a corresponding one of thirty driver amplifiers 186. The output of each of the driver amplifiers 186 is connected to a corresponding one of the core plane select lines 172. The 30-position ring 183 and corresponding driver amplifiers 186 are connected in such a manner that each driver amplifier will have no output when the corresponding stage of the 30-position ring is energized, but will have an output when the corresponding stage of the 30-position ring is not energized. The core plane select lines 172 are passed through the cores in such a direction that the current therethrough tends to set up a flux opposite to the flux set up by the block select lines 168 and character select lines 162. It is conventional to consider such oppositely-threaded lines as passing negative current through the cores; this then is the source of the negative current discussed with respect to FIG. 11. The fourth stage of the 4-position ring 175 and the thirtieth stage of the 30-position ring 183 are connected by lines 187 and 188, respectively, to an AND circuit 189. The AND circuit 189 will have an output when the last stages of both the 4-position ring 175 and the 30-position ring 183 turn off together. This signifies the completion of loading the buffer storage cores with 120 characters. The output of the AND circuit 189 is carried by a line 190 to a load trigger 191. The output from the AND circuit 189 on line 190 represents a "buffer loaded" signal, which indicates that the computer output is completely loaded in the buffer storage and that the printing phase of operation can begin. The buffer loaded signal on line 190 turns the load trigger 191 off as shown in FIG. 15, causing its left-hand output on line 192 to be extinguished. It is this signal on line 192 which tells the computer to read data into the printer buffer storage; therefore, when it disappears, the computer 112 stops sending data, and waits for the printer to complete its operation. At this time, the printer control circuitry waits briefly until the paper has finished feeding to the position in which printing of the data can begin, as is more fully described below.

*Reading Out of Buffer Storage*

Figure 13:
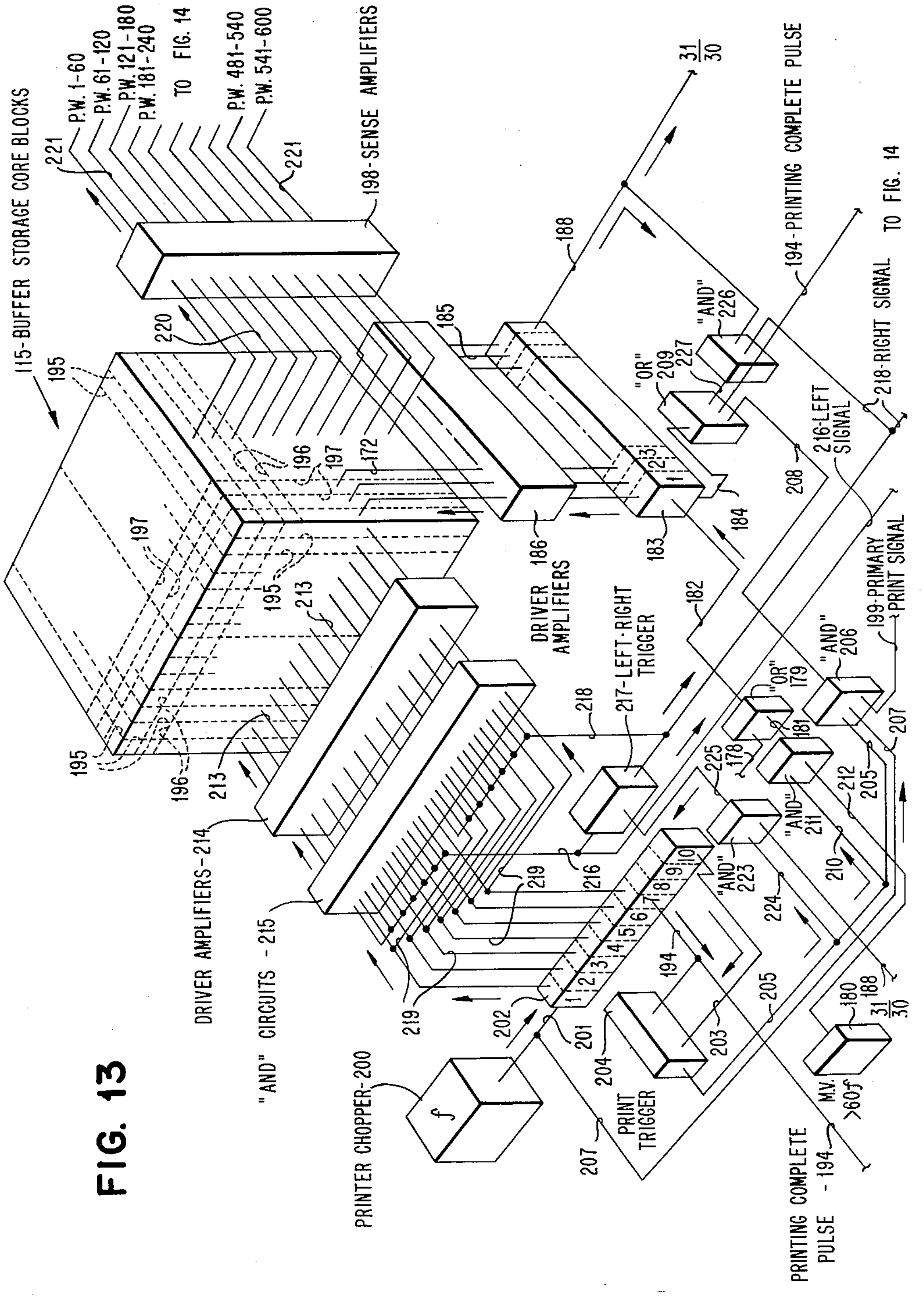
FIG. 13 is a block diagram of the electronic circuitry used for reading data out of the buffer storage for printing.

The circuitry used for reading data out of buffer storage is shown in FIG. 13. The buffer storage cores are threaded with wires in addition to those wires shown in FIG. 11; the threading is such as to divide the cores into planes in three dimensions, there being fourteen planes of cores from left to right in FIG. 13, as shown by the dashed lines 195, and ten horizontal planes as shown by the dashed lines 196, as well as the previously described thirty vertical planes from front to back, as shown by the dashed lines 197.

In reading out the buffer storage to cause printing, each of the fourteen vertical planes 195 receives driving current serially, that is, one plane at a time, and whether or not a bit is stored in each horizontal row of the plane 195 is sensed by a plurality of sense amplifiers 198, there being one of said sense amplifiers for each of the horizontal planes 196. Therefore, each time a vertical plane 195 is sampled with driving current, that plane is electrically divided into ten horizontal rows corresponding to the horizontal planes 196. The horizontal rows are further broken down into the thirty cores in each row by the 30-position ring 183, which was previously introduced. Each time a vertical plane 195 is driven with sampling current, the 30-position ring 183 steps through all 30 of its stages, thereby passing the outputs from thirty cores to each of the ten sense amplifiers 198 corresponding to the horizontal planes 196.

Referring to FIG. 1, the paper 100 is continuously driven to the left by a sprocket driving mechanism 101, which also turns a chopper wheel 107, which is included with the light 108 and photocell 109 in the "printer chopper" 200 in FIG. 13. The chopper wheel has little slits on it, there being one slit for each position on a piece of paper which may receive one horizontal row of dots; in other words, in printing one line of characters, seven slits will pass between the light source 108 and the photocell 109. The machine is designed so that there will be the equivalent of three dot-rows between each line of printed characters; in other words, three slits will pass between the light 108 and photocell 109 as the paper feeds between character rows without receiving any print. In order that the machine might feed more than the amount of paper corresponding to three dot-rows, provision is made in FIG. 13 to receive a primary print signal on line 199; if this signal is not present, the data stored in buffer storage will remain indefinitely, and paper will feed without any printing, as described more fully below. As paper feeds through the machine, the printer chopper 200 continuously sends pulses, one for each of the areas in which a row of dots may print, as before described and shown in FIG. 16. The printer chopper pulses are carried on a line 201 to step a 10-position ring 202, also shown in FIG. 16. Each of the first seven stages of the 10-position ring 202 correspond to one of the rows of dots which may be printed in forming a character; the 8th, 9th and 10th stages of the ring correspond to the space between printed characters, and this is the time in which the computer 112 reads into the buffer storage 115. The 10-position ring is a "closed ring," and will therefore step back to the first stage when pulsed for the eleventh time (and multiplies thereof). The computer operates at a sufficiently high speed so that it will read out all of its data into buffer storage before the 10-position ring will be stepped by the printer chopper from the 10th stage to the first stage. When the ring steps from the 10th stage to the first stage, a pulse will appear on the line 203, which will turn on a print trigger 204, as shown in FIG. 16. With the print trigger on, a signal is sent along a line 205 to an AND circuit 206, where it is combined with the primary print signal on line 199 and printer chopper pulses on a line 207. The output of the AND circuit 206 is fed over a line 208 to an OR circuit 209 and the output of the OR circuit passes over a line 184 to reset the 30-position ring to the first position in the manner described above for FIG. 12. The output of the print trigger 204 is also fed over a line 210 to an AND circuit 211, which then permits pulses from the previously mentioned print multivibrator 180 on a line 212 to pass over the line 181 through the OR circuit 179 and over line 182 to step the 30-position ring. Therefore, when the 10-position ring 202 steps from the tenth position back to the first position, the time at which printing should begin, the print trigger resets the 30-position ring and enables the multivibrator pulses to step the ring. The 30-position ring and the driver amplifiers 186 cooperate as before to send inhibiting current over lines 172 and thereby select each of the vertical planes 197, one at a time; the action of 30-position ring 183 in selecting planes will hereafter be referred to as rippling.

As previously described, there are 14 vertical planes 195 each threaded with a corresponding wire 213 for driving the data out of buffer storage. Each of the planes 195 is sampled by a corresponding one of fourteen output lines 213 from each of fourteen corresponding driver amplifiers 214. The driver amplifiers are conditioned to send driving current through their respective lines 213 by the outputs from fourteen corresponding AND circuits 215. The AND circuits 215 are divided into two groups of seven each; each of the AND circuits in the left-hand group is conditioned by a signal on a line 216 (FIG. 16), which comprises the left-hand output on a left-right trigger 217; each of the AND circuits 215 in the right-hand group is conditioned by an alternative signal on line 218 (FIG. 16), which represents the right-hand output of the left-right trigger 217. For each of the seven rows of dots which may print on a piece of paper, one of the AND circuits in the left group and then one in the right group will be conditioned and one of the driver amplifiers 214 corresponding to each will send driving current over its related line 213 to drive the data out of two of the vertical core planes 195, in turn. The AND circuits are further broken down. Each of the AND circuits 215 is also conditioned by one of the first seven stages of the 10-position ring 202; the first stage of the 10-position ring 202 is connected by the corresponding one of the lines 219 to the first AND circuit in the left-hand group and the first AND circuit in the right-hand group; the seventh stage of the 10-position ring is connected by another one of the lines 219 to the seventh AND circuit in the left-hand group and the seventh AND circuit in the right-hand group; similarly, each of the other AND circuits is connected to an appropriate one of the seven stages of the 10-point ring 202 by a corresponding one of the lines 219. During the prior printing phase of operation, the left-right trigger 217 was left conditioned with the left-hand output 216 on, and the right-hand output 218 off. Thus, when the 10-position ring 202 steps from its 10th position to its first position, the first stage of the 10-position ring is on, and the left-right trigger output on line 216 is present so that the left-most AND circuit 215 will condition the corresponding left-most one of the driver amplifiers 214 to send driving current over a corresponding one of the lines 213 to the left-most one of the vertical planes 195; as before described, the multivibrator 180 causes the 30-position ring 183 to ripple through each of its stages in turn; therefore, each of the sense amplifiers 198 will receive serially the output from 30 cores in the left-most plane 195 over lines 220 corresponding to each of the horizontal planes 196. Each of the sense amplifiers 198 sends an output pulse over a corresponding one of lines 221 to be stored in a related latch for printing, as will be described later in connection with FIG. 14. When the 30-position ring 183 ripples through each of its stages, and the multivibrator pulses it for the thirty-first time the 30th stage goes off, and a pulse, which will be referred to as the 31/30 pulse (lower left, FIG. 13), is sent over line 188 to an AND circuit 223; the other line 224 feeding the AND circuit receives the output from the print trigger 204, which was previously described as going on when the 10-position ring 202 steps from the tenth position to the first position. Therefore, an output becomes available from the AND circuit 223 as the 30th stage is turned off. This output is connected by a line 225 to the left-right trigger 217, and causes the trigger to switch so as to remove the left-hand output on line 216 and to cause an output signal to appear on line 218; the 10-position ring 202 is still standing on its first position: at this time, the eighth from the left of the AND circuits 215 is conditioned by having both an output on line 219 from the first stage of the 10-position ring and an output on line 218 from the right side of the left-right trigger 217. Therefore, the related AND circuit 215 conditions a corresponding one of the driver amplifiers 214 so as to send driving current through the 8th from the left of the vertical planes 195 over the corresponding one of the driver amplifier output lines 213.

As before described, it is now time for the 30-position ring to ripple through all of its stages once again. When the 30th stage of the 30-position ring 183 is turned off, a pulse appears on line 188, which is applied to an AND circuit 226 (lower right of FIG. 13); this pulse on line 188 is the same 31/30 pulse which causes the right-left trigger to switch to the right. The other input to the AND circuit 226 is the right-hand output of the left-right trigger 217 appearing on line 218. Since the left-right trigger switches to the right-hand side at the instant this pulse appears, both inputs to AND circuit 226 are available and an output signal is fed over line 227, as shown in FIG. 16, through the OR circuit 209 to reset the 30-position ring via line 184. Now the circuit is conditioned to read out from the first plane of the right-hand group of vertical planes 195 (8th from the left) which corresponds with the first row of printing and, therefore, with the first stage of the 10-position ring 202. Again the 30-position ring will ripple through each of its stages, and when the 30th stage is switched off, the 31/30 pulse will appear on line 188, pass through AND circuit 223 and over line 225 to reset the left-right trigger 217 to the left position. Since the left-right trigger 217 has switched to the left position, the right-hand output on line 218 is no longer available to the AND circuit 226, so that the 31/30 pulse on line 188 cannot get through the AND circuit 226 to reset the 30-position ring as it did before. When the next printer chopper pulse (corresponding to the second row of dots to be printed) comes along on line 201, the 10-position ring 202 will step from its first stage to its second stage. The output from the printer chopper 200 will also pass over the line 207 to the AND circuit 206, which is currently being gated by the output of the print trigger 204 on line 205 and by the primary print signal on line 199, so that there will be an output on line 208; the output on line 208 passes through OR circuit 209 and over line 184 to reset the 30-position ring 183 as in FIG. 16. As soon as the 30-position ring is reset, the multivibrator 180 will again cause the ring to ripple through each of its stages. Notice the difference in the functions: the left-right trigger is always switched by the 30-position ring 183 when the 30th stage is turned off causing a pulse corresponding to an imaginary 31st position to appear on line 188; the 10-position ring is always stepped ahead by printer chopper 200; the 30-position ring is reset by the printer chopper at the start of reading out the left-hand half of the cores, and is reset by its own 31/30 output pulse at the start of reading out the right-hand half of the cores. This shows that this circuit is designed to allow the reading out of buffer storage to proceed at maximum speed, with a minimum of synchronization; furthermore, each function is performed in the most direct manner in response to the next prior function which it is to follow. For instance, the thing that determines when printing is to occur is the positioning of the paper to receive a row of dots; therefore, the printer chopper (which is controlled by the motion of paper) starts the reading out of the buffer storage to print the row of dots. The end of reading-out of the left group of core planes occurs when the 30-position ring has rippled to its 30th position and turned off; the turning off of the 30th position switches the left-right trigger to condition the right-hand group to be read out, and starts itself rippling through its stages. When the right-hand group is completely read out, as determined by the 30-position ring having rippled through its 30th position, the left-right trigger is set to left, to be ready for the time the paper has been moved so as to receive impressions for the following row of dots, at which time, the printer chopper will step the 10-point ring to the next of its stages and reset the 30-position ring simultaneously so that an additional plane of buffer core storage can be rippled out.

The above described operation will continue until the printer chopper has stepped the 10-position ring 202 through seven positions, indicating that all seven dot-rows on the paper have passed beneath the print wires 105 (FIG. 1) for printing. At this time, the printer chopper 200 steps the 10-position ring 202 to its eighth position, causing the seventh stage to go off, which sends the "printing complete" pulse over line 194 to turn off the print trigger 204 and to turn on the load trigger 191 in FIG. 12, as shown in FIG. 16. This same "printing complete" pulse on line 194 is applied to the OR circuit 209 (lower right of FIG. 13) and causes the 30-position ring 183 to reset to its first stage (FIG. 16) to be ready to receive outputs from the 4-position ring 175. When the load trigger 191 is turned on (FIG. 15, FIG. 16) the "buffer load" signal is carried by line 192 to the computer 112 (FIG. 12) and causes data to begin to ripple out of the computer on the six bit-lines 134—139 in the manner before described with reference to FIGS. 12 and 15.

*Printing Control*

Figure 14:
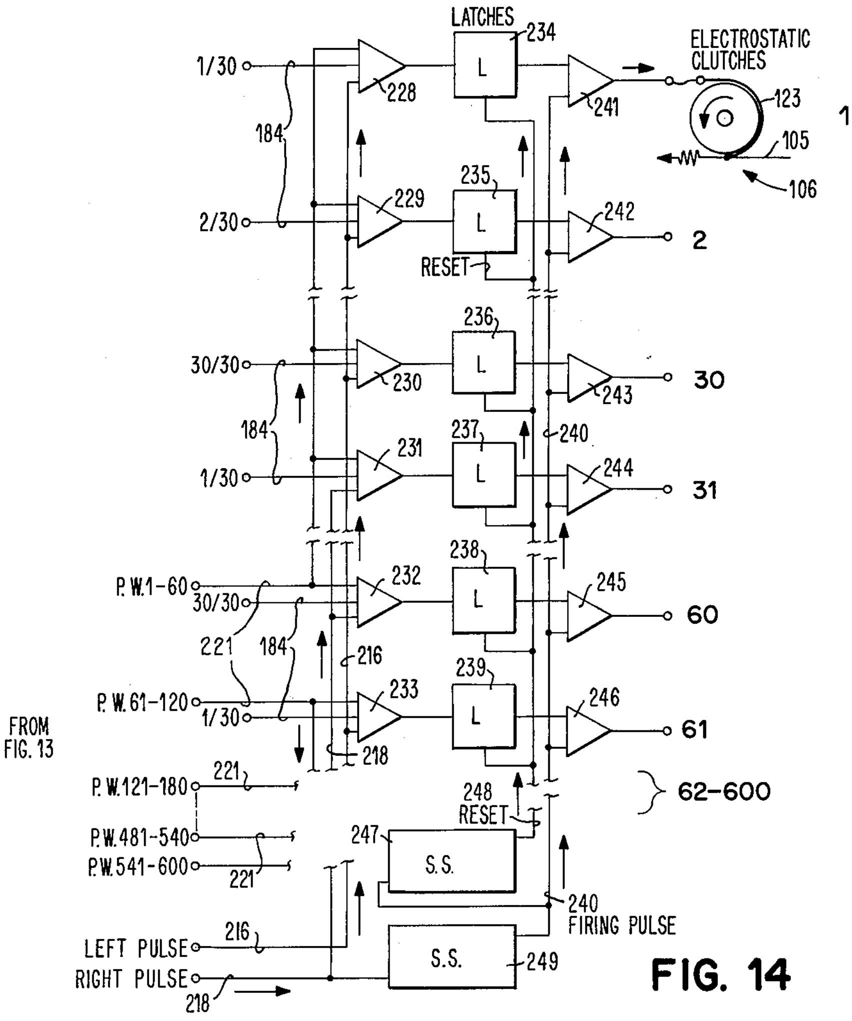
FIG. 14 is a schematic diagram of the circuitry which receives the data output from the buffer storage and controls the printing of said data.

Referring to FIG. 14, each of the lines 221 may receive pulses in response to the sense amplifiers 198 (FIG. 13) in reading out the buffer core storage, and pass the pulses received to a plurality of AND circuits 228, 229, . . . 233. Each of the AND circuits 228—233 controls its respectively corresponding latch 234, 235, . . . 239, which in turn supplies a suitable voltage pulse to the corresponding conductive straps 123 of all of the print clutch units 106 which are to be used in printing the current lines of dots. After the latches 234—239 have been turned on selectively in response to data rippling out of one of the left-hand planes and one of the right-hand planes, the left-right trigger switches to left and the "right" signal on line 218 disappears. When this shift occurs, a single shot (or monostable multivibrator) 249 receives a pulse which generates a firing signal on a line 240 shown in FIG. 16; the firing signal lasts long enough to energize the straps 123 of those clutches 105 corresponding to the selectively energized latches 234—239. The output of each latch 234—239 is fed to a corresponding AND circuit 241, 242, . . . 246 to selectively pass the firing signal on line 240 to the straps 123. When the single shot times-out, the firing signal on line 240 disappears, which energizes a second single shot 247. This sends a short reset pulse on a line 248 (shown in FIG. 16) to each of the latches 234—239 and conditions them to receive the data corresponding to the next row of dots.

Reviewing briefly, in reading out of buffer storage, each of the sense amplifiers 198 receives a series of thirty outputs from each of fourteen vertical planes 195. When the first stage of the 10-position ring is on, this indicates that the data being read out must be printed in the first of the seven successive printing operations. During this time, the left-right trigger 217 (FIG. 13) conditions the extreme left-hand one of the vertical planes 195 for reading out, and then switches to condition the 8th plane from left for reading out. Thereafter, all of the data represented in the first and eighth of the vertical planes 195 must be printed and the latches reset to receive data from the second and ninth planes. The outputs of the sense amplifiers 198 on lines 221 may each have a pulse thereon depending on whether or not that particular wire is to print in the current row of dots; the possible core output pulses appearing serially: thirty from a left-hand plane, followed by thirty from a right-hand plane, on each of the ten output lines 221. The first thirty pulses on the topmost line 221 (P.W. 1–60) are gated through AND circuits 228—230, by the left-signal on line 216 and by the 30-position ring outputs indicated as 1/30, 2/30, etc. Therefore, the first 30 pulses (from the left-most plane), corresponding to print wires 1–30, will go into the latches 234—236. Thereafter, the left-right trigger switches to the right and a pulse appears on line 218, which gates the thirty AND circuits represented in FIG. 14 by the AND circuits 231 and 232. Again, all thirty stages of the 30-position ring will operate in turn, keying each of these AND circuits so as to put the next train of pulses rippling along on the line 221 (those corresponding to print wires 31—60) into the latches represented by 237 and 238. During this time, the same thing will happen for the remaining nine groups of sixty print latches each. Specifically, possible outputs from each of the ten lines 221 will be gated simultaneously through the first one of sixty respective AND circuits into the corresponding latches, which operate print wires 1, 61, 121, 181, . . . 481, 541. Each of the next group of ten possible pulses on lines 221 is gated through the second one of the sixty respective AND circuits to activate print wires 2, 62, 122, 182, . . . 482, 542. This action continues for a total of sixty times, so that each of 600 latches is a possible recipient of a pulse to turn it on. When all 600 latches have been exposed to setting, the print wires are operated in response to those latches which have been turned on. The 10-position ring then steps to the next stage, and the process is repeated until the print wires 105 have printed seven times so as to build a line of characters.

*Summary*

Referring now to the top of FIG. 16, a 15,000 lines-per-minute printer (15,000 l.p.m.) will print at the rate of 250 lines-per-second, which means that the time necessary to print one line is 4 milliseconds. As previously described, this printer operates on a basis of ten subcycles per line of print, each subcycle therefore being four hundred microseconds. In each of the first seven subcycles, thirty groups of ten cores each are read out from the left-hand side of the buffer storage core blocks, followed by thirty groups of ten cores each from the right side of the buffer storage core blocks. It takes about 4 microseconds to read an item of data out of a storage core, which means that 120 microseconds are required to read out of the left side followed by 120 microseconds to read out of the right side, as is shown in FIG. 16. The firing pulse on line 141 must be 150 microseconds long as shown, regardless of the speed at which the printer operates. As the length of the firing pulse 141 decreases from 150 microseconds, the reliability of clutch operation begins to deteriorate; this then is a limiting factor in the speed at which this printer can operate. If advances in the art decrease the time necessary to operate the electrostatic clutches, this portion of the printing subcycles shown in FIG. 16 may be reduced. After the firing pulse 141 operates the electrostatic clutches for printing, a latch reset pulse 248 is used to restore the latches into condition for receiving the next line of data. This pulse is shown for a 15,000 l.p.m. printer to be 10 microseconds, which is a longer time than necessary to reset the latches, but since the time is available in this subcycle it is used for reliable operation. It can be seen therefore, that the 400 microsecond print subcycle comprises 240 microseconds to ripple sixty parallel groups of ten items each serially out of buffer storage, 150 microseconds to print, and 10 microseconds to reset. By increasing the equipment of the type disclosed in this application, more cores at a time could be read out of storage in parallel: for instance, if thirty lines 220 were provided with thirty corresponding sense amplifiers 198 appropriately connected to the buffer storage core blocks, a ten position ring could be substituted for the thirty position ring 183 and the time necessary to read the data out of buffer storage could be reduced by two-thirds. The firing pulse 141 and latch reset pulse 248 would still require about 160 microseconds, but reading the data out of buffer storage would only require 80 microseconds, instead of 240 microseconds. This would make it possible to print each row of dots in 240 microseconds instead of 400 microseconds, which is comparable to 25,000 lines per minute. However, at this speed, the difficulty in paper handling, and the additional cost and space requirements of the printer increase by more than a proportional amount. Therefore, it is believed that the series-parallel proportionality of the described form of this printer compared with the ultra-high speed thereof represents a preferable embodiment of my invention.

It is to be understood that the components of my preferred embodiment represent functional units, the exact description of which is a matter of design preference; these may be selected so as to be compatibly operable within the specifications to which a given machine must conform.

While the invention has been particularly shown and described with reference to preferred embodiments thereof, it will be understood by those skilled in the art that the foregoing and other changes in form and details may be made therein without departing from the spirit and scope of my invention.

I claim:

1. In a printer of the matrix type in which the outlines of printed characters are formed on an impression receiving web by a combination of the dots of a grid of dots arranged in columns, the combination of a plurality of print impressing elements arranged in a row for forming said dots, one element in each column of the grid; means for providing relative motion between said elements and the impression receiving web; an impelling means for each of said elements, each of said impelling means including an electrostatic clutch operable to drive the corresponding one of said elements into impact with said web independently of the remainder of said elements; means to receive data representable by printed characters; means to generate groups of data bits in respone to said data receiving means, each bit corresponding to one of said elements; means to transmit said groups of data bits to said impelling means serially by group and parallel by bit; and means for operating each of said impelling means in response to the corresponding bit of successive ones of said groups of data bits.

2. The device described in claim 1 in which said relative motion means moves said impression receiving web perpendicular to said row of elements.

3. In a printer of the matrix type in which the outlines of printed characters are formed on an impression receiving web by a combination of the dots of a grid of dots arranged in columns, the combination of a plurality of print impressing element sets arranged in a row, for forming said dots, one element in each column of the grid, each set corresponding to a printable character position; means for providing relative motion between said elements and the impression receiving web; an impelling means for each of said elements, each of said impelling means including an electrostatic clutch operable in response to selecting data bits to drive selected ones of said elements into impact with said web independently of the remainder of said elements; means for receiving blocks of data bits, each bit corresponding to a dot of the grid, and converting each of said blocks into a plurality of groups; and means for transmitting said groups of data bits serially by group to operate said impelling means for printing characters corresponding to said blocks of data bits.

4. The device described in claim 3 in which said motion providing means moves said web perpendicular to said row of print impressing elements sets.

5. In a printer of the matrix type in which the outlines of printed characters are formed on an impression receiving web by a combination of the dots of a grid of dots arranged in columns, the combination of a plurality of print impressing elements arranged in a row for forming said dots, one element in each column of the grid; means for moving an impression receiving web past said elements in a path perpendicular to said row; an impelling means for each of said elements, each of said impelling means including an electrostatic clutch operable to drive the corresponding one of said elements into impact with said web independently of the remainder of said elements; a buffer storage means; means for loading into said buffer storage means groups of bits, each bit of a group being representative of a different one of the dots constituting one row of dots of a character, the character being composed of a plurality of said rows of dots; and means responsive to said buffer storage means for operating said impelling means simultaneously in response to data bits corresponding to one of said rows, and successively in response to different ones of said rows of data bits.

6. In a printer of the matrix type in which the outlines of printed characters are formed on an impression receiving web by a combination of the dots of a grid of dots arranged in columns, the combination of a plurality of print impressing elements arranged in a row for forming said dots, one element in each column of the grid; means for moving the impression receiving web past said elements in a path perpendicular to said row; an impelling means for each of said elements, each of said impelling means including an electrostatic clutch operable to drive the corresponding one of said elements into impact with said web independently of the remainder of said elements; a buffer storage means; means for entering blocks of data bits into said buffer storage means, each of said blocks corresponding to a printable character, each of said blocks being arranged in said buffer storage means in a plurality of groups, each bit corresponding to a respective one of said print impressing elements; means for reading said groups of data bits out of buffer storage serially by group; and means for operating said impelling means in response to said groups of data bits.

7. In a printer of the matrix type in which the outlines of printed characters are formed on an impression receiving web by a combination of the dots of a grid of dots arranged in columns, the combination of a plurality of print impressing elements arranged in a row; means for moving the impression receiving web past said elements in a path perpendicular to said row; an impelling means for each of said elements, each of said impelling means including an electrostatic clutch operable to drive the corresponding one of said elements into impact with said web independently of the remainder of said elements; a buffer storage means; means for entering blocks of data bits into said buffer storage means, each of said blocks corresponding to a printable character, each bit of a block being representative of a different one of the dots constituting the matrix, each of said blocks being arranged in said buffer storage means in a plurality of groups, each bit of a group corresponding to one element in said row of elements; means for reading said groups of data bits out of buffer storage serially by group; and means for operating said impelling means in response to said data bits.

8. In a printer of the matrix type in which the outlines of printed characters are formed on an impression receiving web by a combination of the dots of a grid of dots arranged in columns, the combination of: a platen; a plurality of dot impressing elements arranged in a row adapted for independent movement toward and away from said platen for forming said dots, one element in each column of the grid; means for moving the web between said platen and said elements; means for biasing said elements away from said platen; a rotor of electroadhesive material; a plurality of flexible bands of conductive material, each band having two ends, each band associated with one of said elements and having one end attached thereto, the band encircling at least an arcuate portion of said rotor, the other of said ends held stationary with respect to said element; selection means for effectively applying a potential between selected ones of said bands and said rotor for causing adhesion of the selected bands to said rotor; and means for continuously rotating the rotor in a direction to cause the adhered bands to impel its associated print element into contact with said platen upon activation of said selection means.

References Cited in the file of this patent

UNITED STATES PATENTS

| | | |
|---|---|---|
| 2,575,342 | Gridley | Nov. 20, 1951 |
| 2,675,427 | Newby | Apr. 13, 1954 |
| 2,702,380 | Brustman et al. | Feb. 15, 1955 |
| 2,708,267 | Weidenhammer | May 10, 1955 |
| 2,909,995 | Hannibal | Oct. 21, 1955 |
| 2,728,289 | Johnson | Dec. 27, 1955 |
| 2,730,040 | Johnson | Jan. 10, 1956 |
| 2,773,443 | Lambert | Dec. 11, 1956 |
| 2,831,424 | MacDonald | Apr. 22, 1959 |
| 2,907,526 | Havens | Oct. 6, 1959 |
| 2,910,240 | Havens | Oct. 27, 1959 |
| 2,909,996 | Fitch | Oct. 27, 1959 |